May 8, 1934.                C. W. DIETRICH                1,958,186
                            STORAGE BATTERY
                   Filed April 21, 1931         4 Sheets-Sheet 1
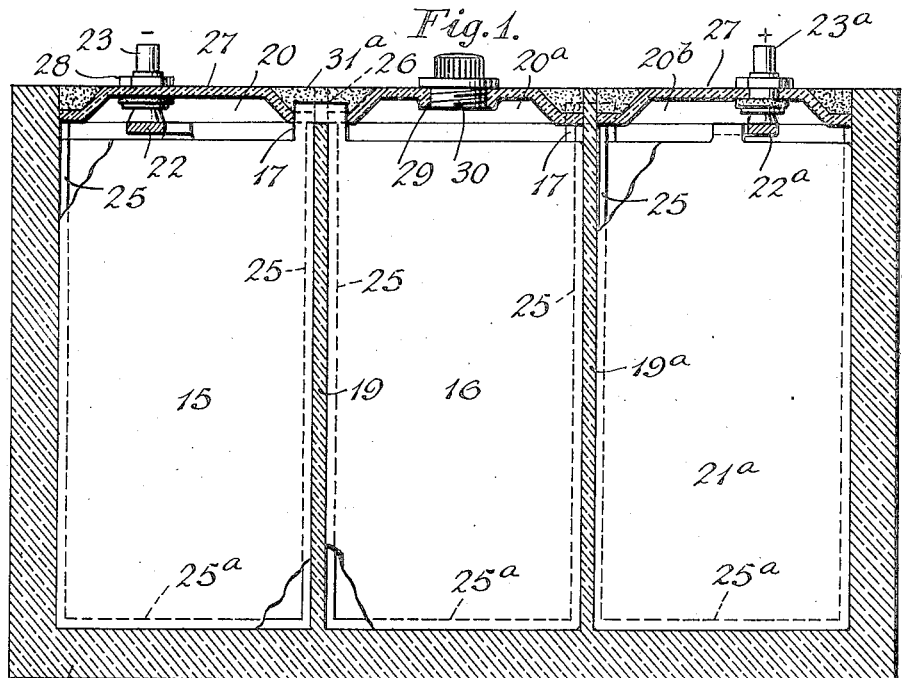
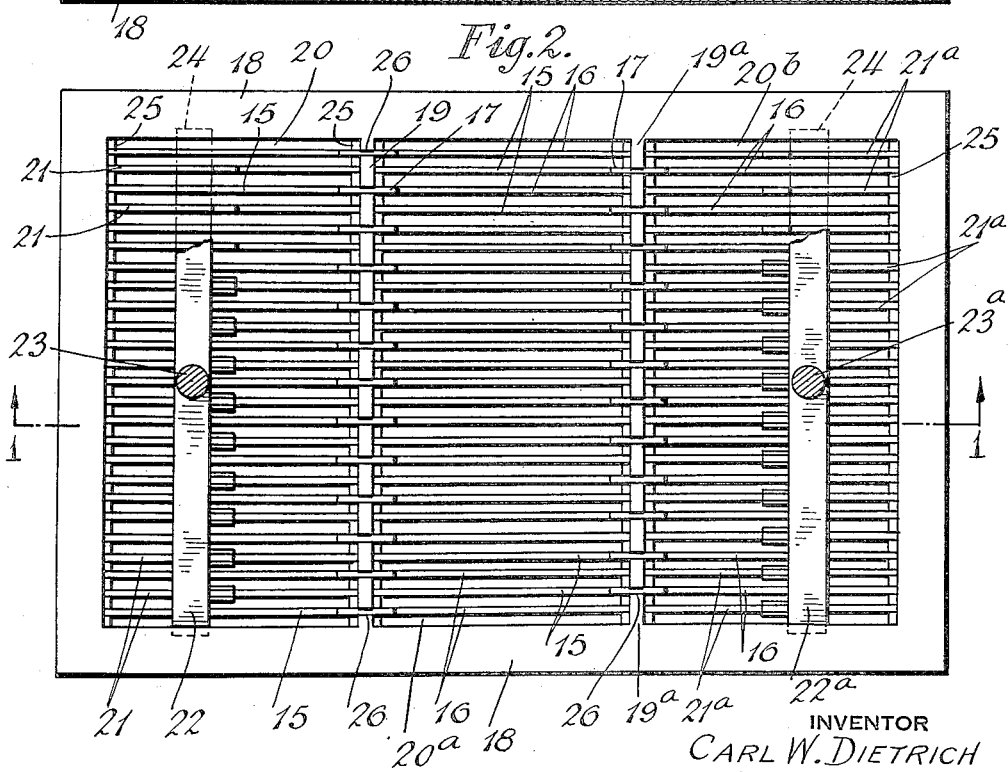
INVENTOR
CARL W. DIETRICH
BY
ATTORNEYS May 8, 1934.     C. W. DIETRICH     1,958,186
STORAGE BATTERY
Filed April 21, 1931     4 Sheets-Sheet 2
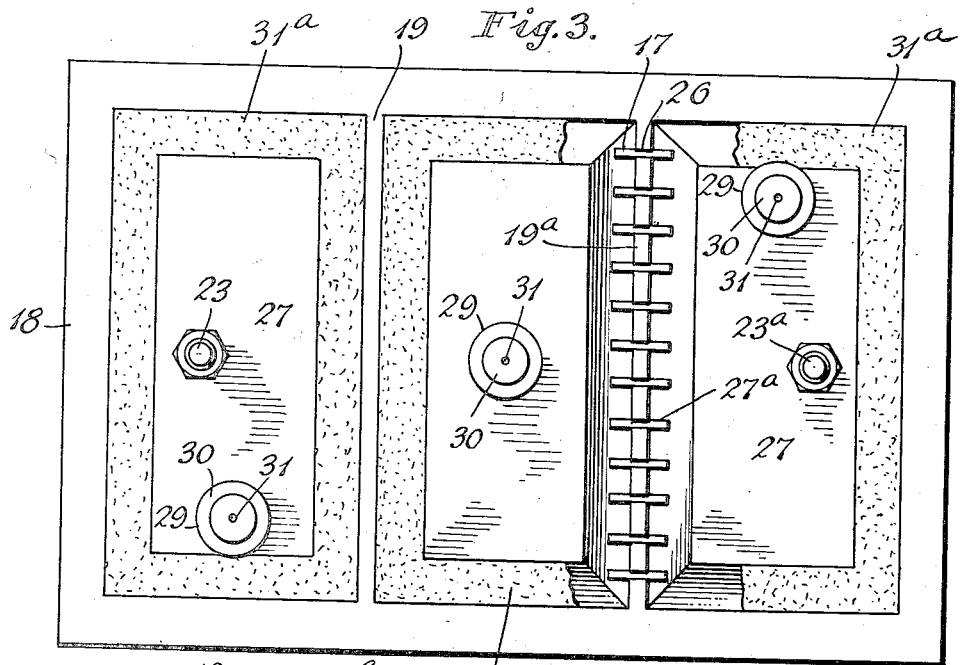
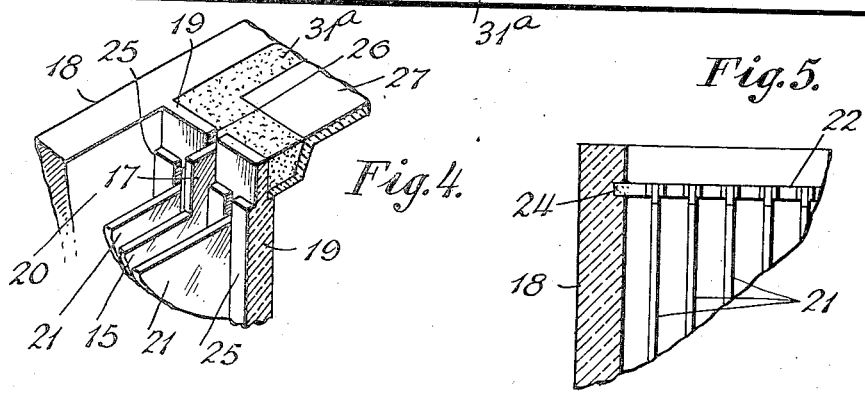
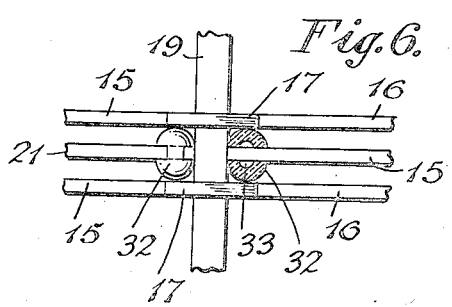
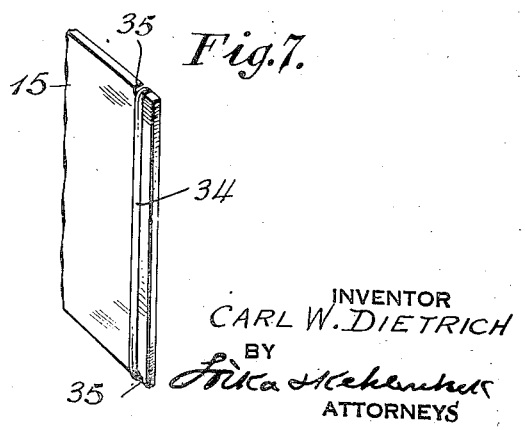
INVENTOR
CARL W. DIETRICH
BY
ATTORNEYS May 8, 1934.  C. W. DIETRICH  1,958,186
STORAGE BATTERY
Filed April 21, 1931   4 Sheets-Sheet 3

INVENTOR
CARL W. DIETRICH
BY
ATTORNEYS

May 8, 1934. C. W. DIETRICH 1,958,186
STORAGE BATTERY
Filed April 21, 1931 4 Sheets-Sheet 4

INVENTOR
CARL W. DIETRICH
BY
ATTORNEYS

Patented May 8, 1934

1,958,186

UNITED STATES PATENT OFFICE 1,958,186

STORAGE BATTERY

Carl W. Dietrich, Lancaster, N. Y.

Application April 21, 1931, Serial No. 531,669

1 Claim. (Cl. 136—6)

The invention relates to secondary or storage batteries and has for its object to provide a battery of this type which is of maximum simplicity in construction and of maximum operative efficiency. The invention contemplates further the provision of a novel pair of plates, each plate of the unit being of opposite electrical polarity in which the grid of the positive plate and grid of the negative plate are both permanently cast together in the form of a unit by one single casting. Other more specific objects will appear from the description hereinafter, and the features of novelty will be pointed out in the claim.

Figure 8:
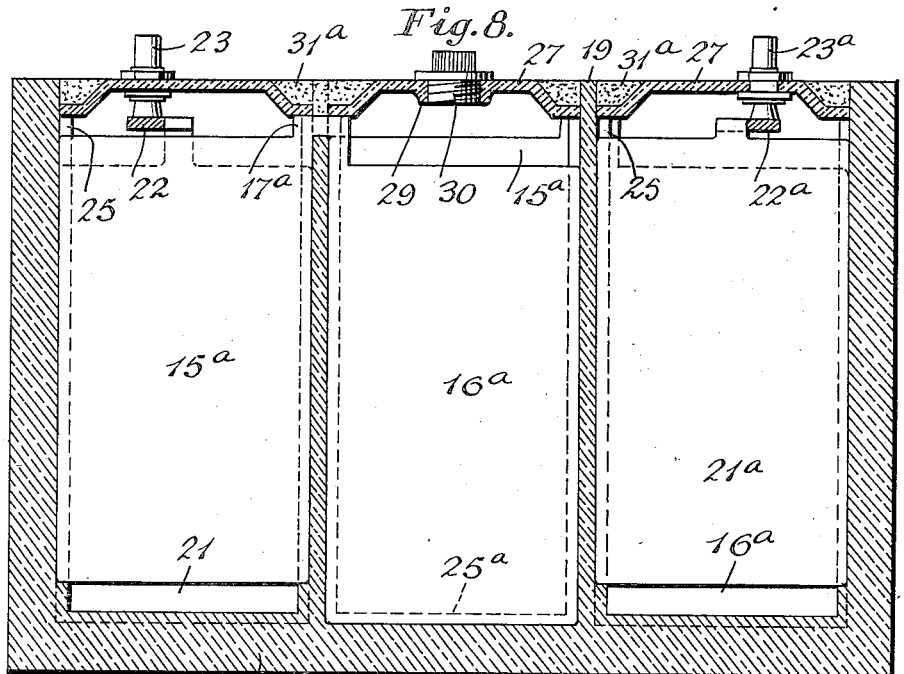
Figure 9:
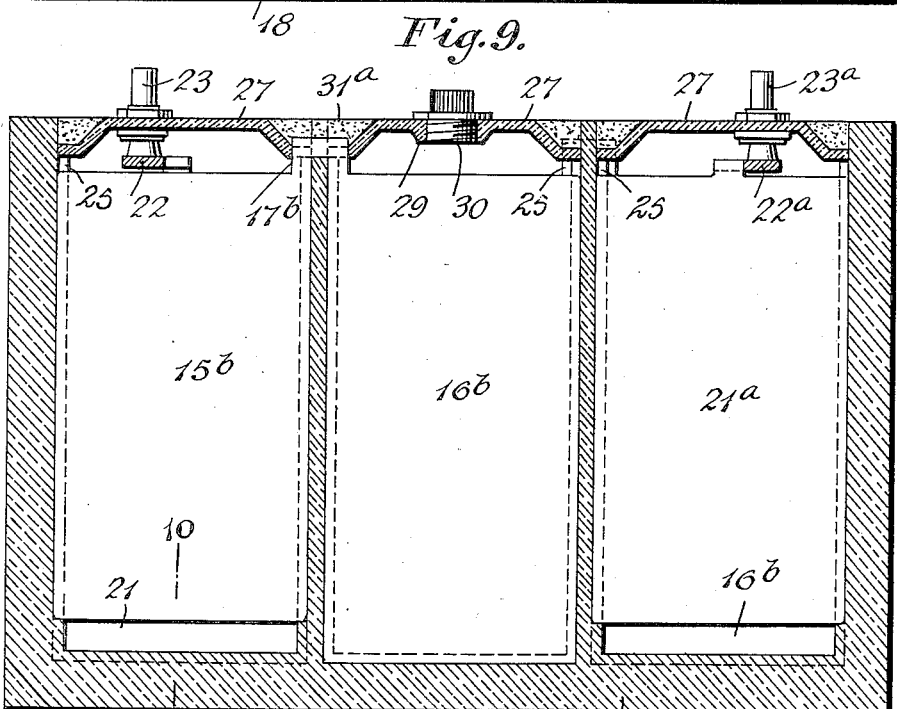
Figure 10:
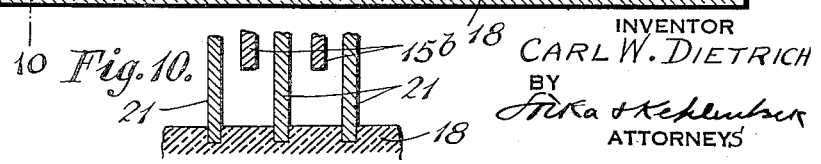
Figure 11:
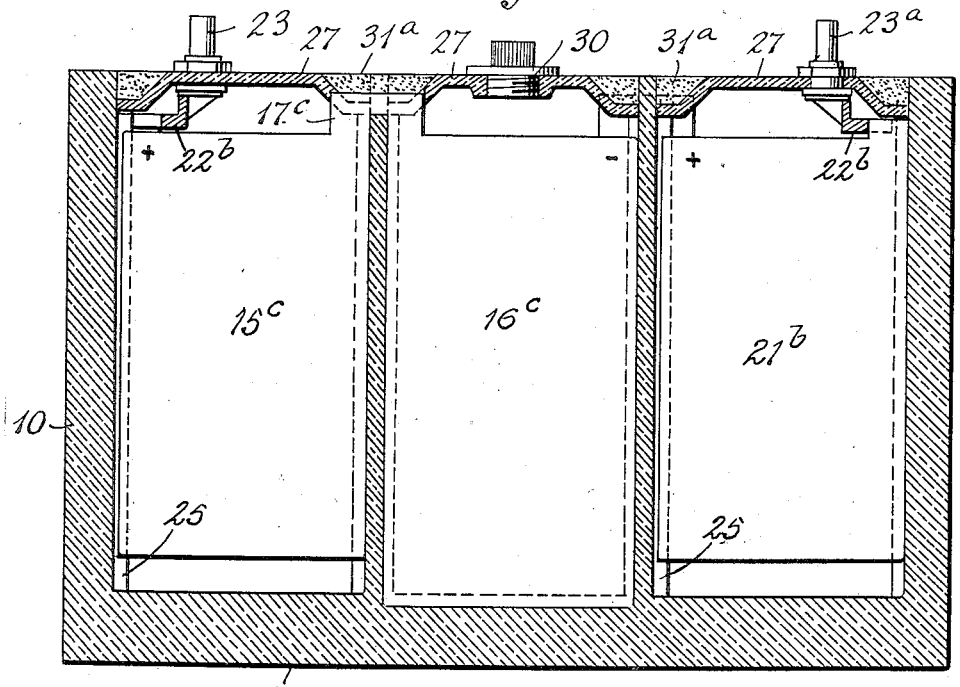
Figure 12:
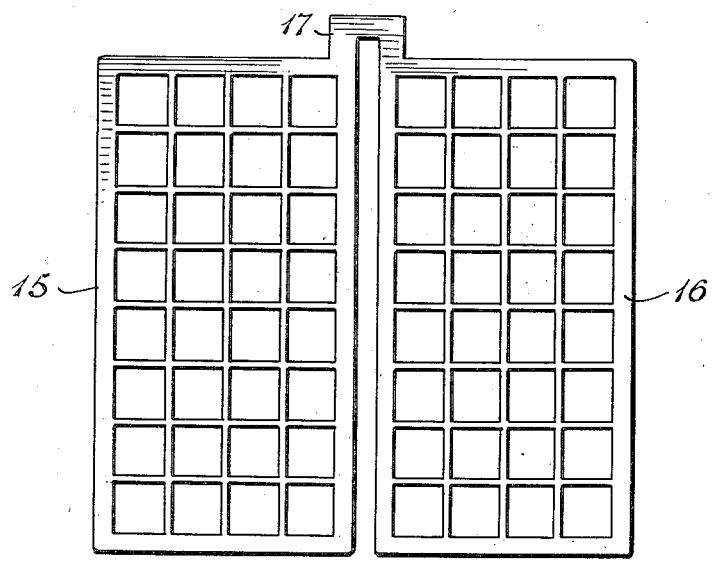

In the accompanying drawings, which illustrate examples of the novel battery and the novel pair of plates, without defining the limits of the invention, Fig. 1 is a longitudinal section of one form of battery on the line 1—1 of Fig. 2; Fig. 2 is a plan view of the battery shown in Fig. 1 with the covers omitted; Fig. 3 is a plan view of the complete battery with parts broken away to show interior construction; Fig. 4 is a fragmentary perspective illustrating the interior construction of the battery; Fig. 5 is a fragmentary sectional view; Fig. 6 is a fragmentary plan view illustrating means whereby the plates are maintained out of contact with each other; Fig. 7 is a fragmentary perspective of a plate illustrating another form of spacing means; Figs. 8 and 9 are longitudinal sections of batteries illustrating additional forms of the plates; Fig. 10 is a fragmentary section on the line 10—10 of Fig. 9; Fig. 11 is a view similar to Fig. 9 and showing another form of the invention, and Fig. 12 is a face view of a trimmed casting or the novel grid construction, both grids being permanently cast together in the form of a unit by one single casting (preferably of a lead-antimony alloy) as in the form included in Fig. 1.

The novel plates, which comprise an essential feature of the novel battery, each consist of two independent sections or plates 15 and 16, the opposed longitudinal edges of which are spaced apart to form a recess between and longitudinally of said sections 15 and 16, which recess is open at its lower end for the purpose to be more fully set forth hereinafter. The plates 15 and 16 are permanently connected with each other in the form of a unit by means of a rigid member or yoke 17 which is preferably a part of the positive and negative plate grid castings, or otherwise formed in one piece with such sections 15 and 16 at the upper adjacent corners thereof, as shown in Figs. 1 and 12. The twin plates 15 and 16 are of opposite electrical polarity, that is, if the plate section 15 is of positive polarity, the section 16 will be of negative polarity, or vice versa. An example of the twin plates or pair of plates in the form of a finished, trimmed double grid casting or pair of grids, before the active material or stiff paste has been applied is shown in Fig. 12. The rigid connecting members or yokes 17 being preferably cast as part of the lugs are accordingly made of electrical conductive material and take the place of the customary cell connectors of existing types of batteries and accordingly avoid the necessity for the use of such connectors.

The battery itself comprises a container 18, which may be of any suitable type and material, and generally is constructed in rectangular form, as shown in Figs. 1, 2 and 3. The container is provided interiorly with partitions 19 which extend transversely across said container at spaced intervals and divide the same into a plurality of independent non-communicating compartments such as 20, 20a and 20b, as illustrated in Fig. 2. In the assembled condition of the battery, the members or yokes 17 of the pair of plates bridge the partitions 19 and serve to position the sections 15 and 16 of each pair of plates in different adjacent cells, such as, for instance, 20 and 20a, as shown in Figs. 1 and 2; in this condition, the partitions 19 extend into the recesses which exist between the opposed longitudinal edges of each pair of plate sections 15 and 16. Instead of using a container with partitions as described, separate jars of suitable material may be used and placed in a container, case or tray; that is one jar for each cell.

In the form of a three cell battery, as shown in Figs. 1, 2 and 3, the pair of plates comprising the sections 15 and 16 are slipped over the partitions 19 and 19a respectively, so that the pair of plates which are combined with the partition 19 are in longitudinal staggered relation to those pairs of plates which are combined with the partition 19a and so that alternate plates in the central cell 20a are of opposite electrical polarity located in spaced surface parallelism with each other, as shown in Fig. 2. In order to complete the battery construction, individual plates 21 and 21a are located in the terminal cells 20 and 20b respectively, in interposed spaced parallel surface relation to the plates 15 or 16 therein. The individual plates 21 and 21a in each of the cells 20 and 20b are of opposite electrical polarity relatively to the sections 15 or 16, as the case may be. In the preferred arrangement, the individual plates 21 and 21a are supported by or suspended from plate straps 22 and 22a in the number required to complete the arrangement electrically. Customary terminal posts 23 and 23a are part of the plate straps 22 and 22a respectively, and project upwardly therefrom, as shown in Fig. 1 (i. e., a customary terminal group is used in each end cell, one positive and the other of negative polarity). In the preferred arrangement, the plate straps 22 and 22a have their opposite ends projecting into suitable recesses 24 formed in the walls of the container 18 at a predetermined distance below the top thereof, as shown in Fig. 5; in order to effect a secure permanent connection between the plate straps and the container 18, said plate straps are originally dimensioned to snugly fit within the container 18 and after having been placed therein in registry with the recesses 24 are subjected to burning whereby the metal material comprising said plate straps 22 or 22a is fused and caused to flow into said recesses 24. With this arrangement, the plate straps are combined with the container in a permanent manner and so as to efficiently resist the effects of vibrations and other forces to which the battery may be subjected in use and tending to break the connection; the rigid connection effected in this way between the plate straps and the container also acts as a support for the positive terminal group or individual plate sections 21b, when arranged as in Fig. 11, thus taking considerable weight off the cell cover 27. This arrangement also enables the customary terminals to serve as projections for the temporary connection of removable carriers which are slipped over the terminal posts, whereby the carrying about of the batteries is facilitated, without strain or possible injury to the same.

Any suitable means may be provided for maintaining adjacent plates or plates out of contact with each other; for instance, as shown in Figs. 1, 2 and 4, ribs 25 may be provided upon the inside surfaces of the end walls of the container and upon the opposite surfaces of the partitions 19 and 19a in parallel spaced relation, to provide grooves into which the plates or pair of plates project, as illustrated in the drawings. In such case, it is desirable also to provide the partitions 19 and 19a with upwardly open notches 26 in registry with the aforesaid grooves for the accommodation of the members or yokes 17, as shown in Figs. 1, 2 and 4. It may be also desirable in certain types of battery to extend the ribs 25 transversely across the bottoms of the individual battery cells in the form of auxiliary ribs 25a to form grooves in said bottoms into which the lower ends of the plates 15 and 16, and the individual sections 21 and 21a in such case extend, as shown in Fig. 1. This type of battery which permits all of the plate sections to engage the bottoms of the cells generally utilizes a non-fluid electrolyte; in this type of battery the plates do not develop a precipitate in the use of the battery which is likely to build up a connection between plates of opposite polarity to thereby cause a short circuit in the battery. Each of the cells of the battery has its upper end closed by means of a cover 27 of inverted dished form and resting, for instance, upon the upper ends of the ribs 25 which, in such case, terminate at a distance below the upper edges of the container walls, as illustrated in Fig. 1. The covers 27 include notches 27a so located and arranged as to receive and accommodate the yokes or members 17, when the covers are in place to close the battery cells; the covers 27 of the terminal cells 20 and 20b in addition are provided with openings through which the terminal posts 23 and 23a project upwardly, so as to be accessible exteriorly of the container 18 for the reception of the usual terminals in any customary manner. Any conventional type of fastening device such as nuts 28 may be provided for rigidly connecting the posts 23 and 23a with the covers 27. The covers 27 are further provided with filling openings 29 normally closed by means of removable caps 30, which include the conventional vents 31 to permit venting in the well known way. The dished form of the covers 27 provides recesses which are filled with any customary type of sealing material 31a, whereby the battery is sealed; in its initial condition, this sealing material 31a is generally fluid or viscous in character and accordingly flows into the notches 26 of the partitions 19 and 19a, and also into the notches 27a of the covers 27, so that an efficient and complete sealing of the cells is effected.

Instead of maintaining the plates out of contact with each other in a manner so far described, any other suitable means may be provided for this purpose. For instance, as shown in Figs. 6 and 7, devices carried by the plates themselves may serve to maintain contiguous sections thereof out of contact with each other. As shown in Fig. 6, the device comprises units 32 of non-conducting material sprung upon the plate sections at predetermined points thereof, as indicated, for instance, in Fig. 6; to maintain these units in place, the plates may be provided upon opposite faces with projections 33 arranged to extend into recesses with which said units in such case are provided. Instead of the units shown in Fig. 6, the plate sections may be provided with bands 34 extending lengthwise thereof in vertical directions and made of suitable non-conducting material; in their simplest forms, these spacing bands may comprise continuous rubber bands which are simply stretched over the plates and fixed thereon against unintentional dislocation by means of notches 35 with which said plates or pair of plates may be provided, as shown in Fig. 7.

The batteries shown in Figs. 8 and 9 of the drawings are representative of that type in which a liquid electrolyte, in contra-distinction to a non-fluid electrolyte, is utilized; in such batteries, the plates gradually shed their active material which descends to the bottoms of the cells in the form of a sediment. Unless provision is made to prevent the same, this sediment will finally accumulate to such an extent that a connection will be effected between plates of opposite polarity whereby the battery is short-circuited. To prevent this, the novel pair of plates are provided in two additional forms, in both of which the lower edges of the plates of a given novel unit or pair of plates are out of horizontal registry with each other; when in place in the container, the lower edge of one plate section is thus spaced from the bottom of the cell in which it is located, and accordingly is out of reach of any normal accumulation of sediment.

In the form shown in Fig. 8, this result is attained by making each plate or pair of plates or sections 15a and 16a, which are duplicates of each other in shape and dimensions, and which are arranged in staggered relation to each other, so that both the upper and lower edges of said sections are out of horizontal registry, as illustrated in Fig. 8. The plate sections 15a and 16a have their opposed longitudinal edges spaced apart in the manner previously described to form corresponding recesses therebetween, and are connected at their upper edges by rigid connecting members or yokes 17a corresponding to the previously mentioned yoke.

In the form shown in Fig. 9, the one plate of the pair of plates, for instance, 15b, is made shorter than the other plate, for instance, 16b, whereby the lower edge of the section 15b is out of horizontal registry with the corresponding edge of the plate 16b. In this form also, the plates have their opposed longitudinal edges spaced apart as previously described and are permanently connected with each other at their upper edges by means of rigid connecting members or yokes 17b similar to those mentioned hereinbefore.

In each of the forms now under discussion, the grooves between the ribs 25 in which the plates 15a and 15b are accommodated, terminate at a distance above the bottoms of the cells in which said plates are located, so that the lower ends of said grooves provide rests or supports for the lower edges of said plates. The plates 16a and 16b extend to the bottoms of the cells in which they are contained and may, as shown, be received in grooves, as in the form first described. In all other respects, the batteries shown in Figs. 8 and 9, and the details thereof may correspond to the construction and arrangement of the form of battery described hereinbefore.

In certain types of batteries the positive plates increase in size or grow during use due to the expansion of the active material, and injury to said plates and to adjacent portions of the battery ofttimes result therefrom. In the form shown in Fig. 11 this danger is positively obviated as will appear more fully hereinafter.

As illustrated in Fig. 11 the grooves formed between the ribs 25 extend to the bottoms of the cells along opposite vertical walls thereof as in Fig. 1, and the positive plates 15c of the pair of plates, and the individual plates 21b of positive polarity are shorter than the other plate sections and have their lower edges located at a distance above the bottoms of the cells. The plate 15c and 21b are also of somewhat less width than the other sections so that when said plates are in place in the cells a space will exist between the free vertical edges thereof and the adjacent walls of said cells as shown at the left hand sides of the two terminal cells in Fig. 11. The plates 15c, as in the previous forms, comprise integral parts of the pairs of plates which include a negative plate 16c and connecting yokes 17c similar to those of the other illustrated forms of the invention. Likewise, the individual plates 21b are supported by or suspended from plate straps 22 or 22a as in the forms first described. In order to make it possible to provide the individual plates by simply cutting in two pairs of plates consisting of connected plates of different polarity, such as the unit 15c and 16c, the plate straps 22b are arranged as in Fig. 11 in which the projections or lugs to which said straps are attached are located at upper corners of the plates and simply comprise parts of the previously existing yokes 17c. This makes it unnecessary to provide individual plate sections such as 21b of special construction. Otherwise the battery shown in Fig. 11 may be the same as those previously described herein.

With the arrangement shown in Fig. 11 it will be obvious that the positive plate sections 15c and 21b may increase in size both downwardly and transversely without damage either to themselves or to adjacent parts of the battery.

The novel construction and arrangement in all of its forms eliminates the necessity for any of the customary separators necessary in conventional types of batteries and does away with the use of the usual cell connectors also required in such existing batteries. The customary plate straps are also reduced to a minimum in that but two straps are needed, regardless of the size of the battery or the number of cells contained therein, providing all the cells are in line. The provision of battery plates in the form of the novel unit of opposite electrical polarity not only simplifies materially the construction of the battery and the assembling thereof, but in addition, increases the efficiency of the battery to the highest possible point; this is true, regardless of the particular type of storage battery or the nature of the electrolyte used therein. The novel double grid and the connecting members or yokes may be cast, or otherwise produced to provide the unitary construction desired. The plates may be pasted, either by hand or machine, to provide the desired polarity, or any method determined may be used to make the plates. In a two cell battery, the different plates each consisting of two sections of opposite electrical polarity are simply located in reverse relation to each other to position the sections thereof in adjacent cells with the alternate sections in each cell of opposite electrical polarity. As the number of cells increases, it becomes necessary, as hereinbefore described, to introduce individual plate sections between the plate sections of the complete units in the terminal cells. As previously stated herein, the polarity of these individual plate sections will be opposite to the polarity of the plate sections in the same cells.

Various changes in the specific forms shown and described may be made within the scope of the claim without departing from the spirit of the invention.

I claim:—

An electric storage battery comprising a container, partitions whereby said container is divided into a plurality of independent non-communicating compartments, said partitions being each provided at their upper edges with a plurality of spaced upwardly open notches, a plurality of pairs of plates, each of the two plates of a given pair lying in the same plane and being of opposite electrical polarity and having their opposed vertical edges in spaced relation, rigid electrically conductive connecting members whereby said plates or sections are permanently connected in pairs, said members bridging said partitions and fitting into the notches thereof for supporting the two plates of each pair of plates in different compartments, the pairs of plates being positioned so that alternate plates in each compartment will be of opposite electrical polarity, the adjacent plates in each compartment being fixed in spaced relation by said connecting members in co-operation with the notches of said partitions, individual plates in the terminal cells, located between the plates of opposite electrical polarity relatively thereto, connecting straps whereby said individual plates are secured together forming groups, terminal posts carried by said straps, covers of inverted dished form closing said compartments and each provided with a plurality of horizontally open notches fitted over said rigid connecting members and having openings for vent-caps and for the accommodation of said terminal posts, the dished form of said covers providing recesses at the sides thereof, and sealing material in said recesses.

CARL W. DIETRICH.